Aug. 9, 1932.      E. H. REMDE      1,870,690
INDUSTRIAL TRUCK
Filed July 20, 1928      7 Sheets-Sheet 1

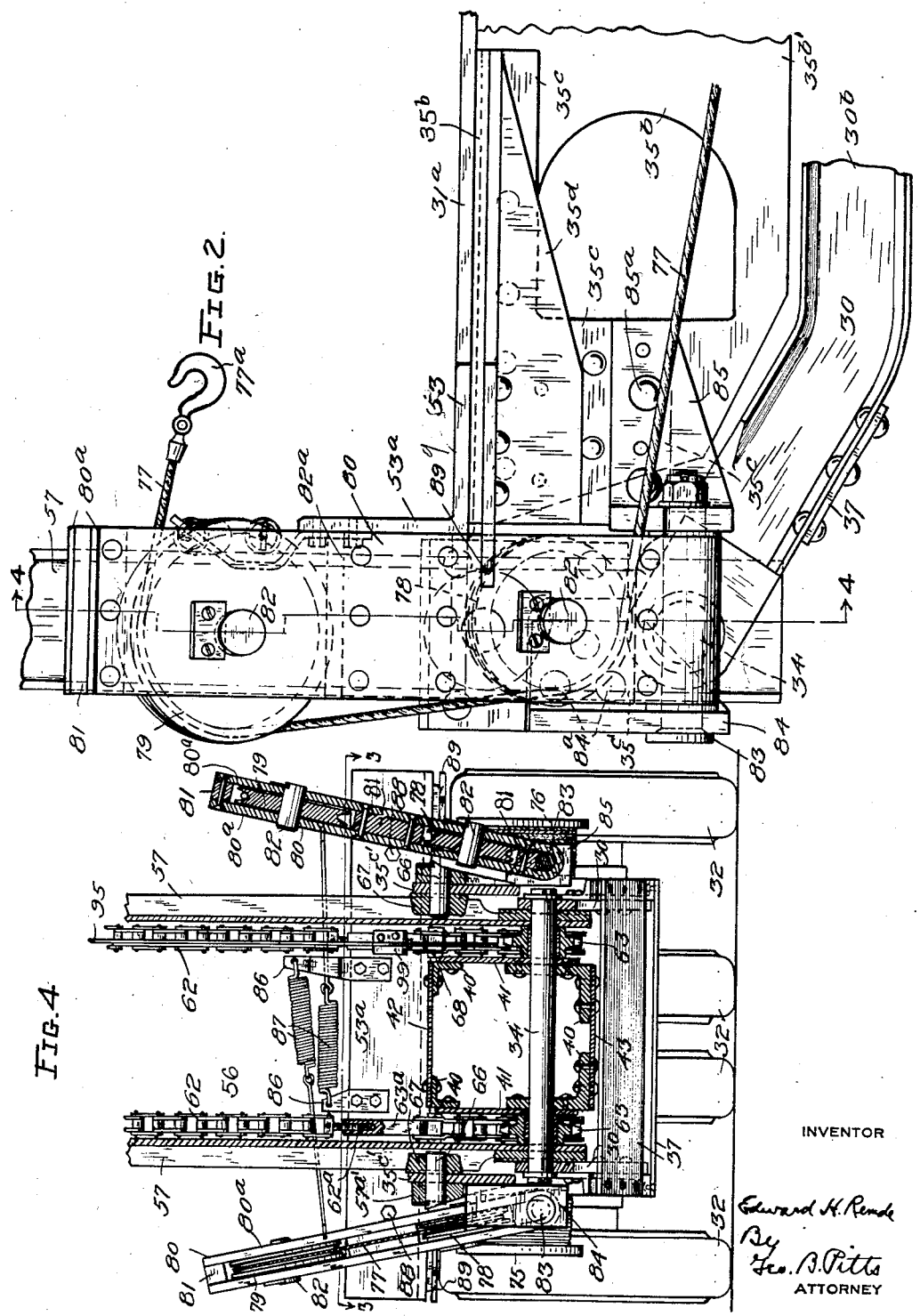

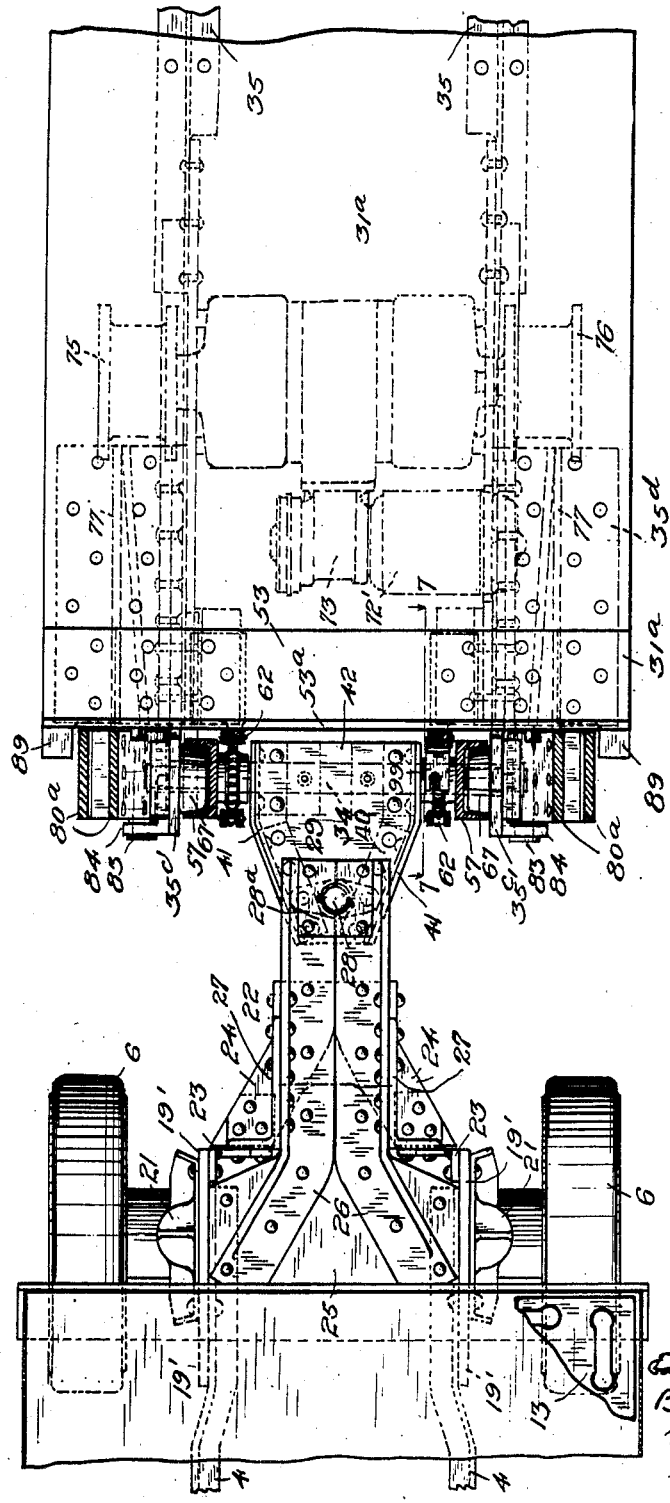

Aug. 9, 1932.  E. H. REMDE  1,870,690
INDUSTRIAL TRUCK
Filed July 20, 1928   7 Sheets-Sheet 4
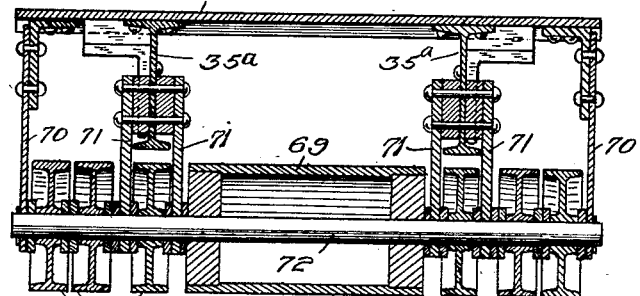
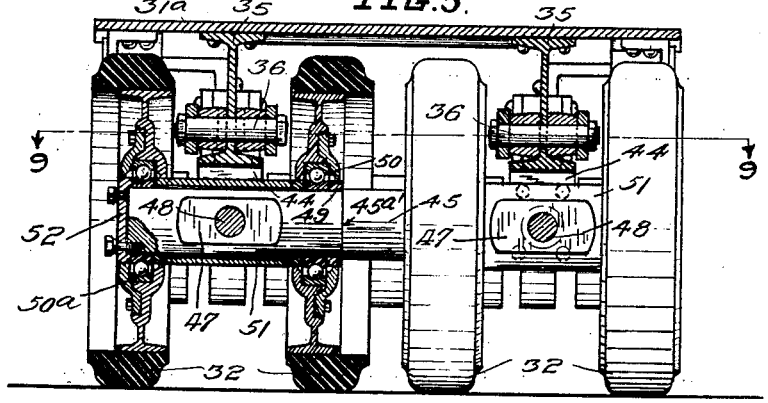
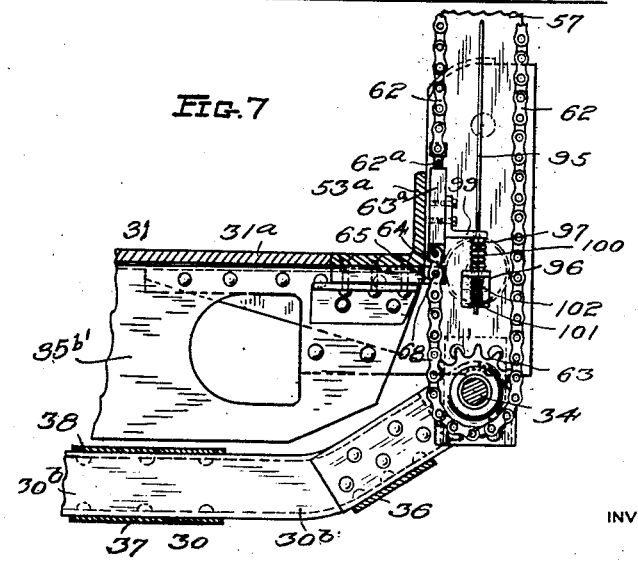
INVENTOR
Edward H. Remde
BY
Geo. B. Pitts
ATTORNEY Aug. 9, 1932.                    E. H. REMDE                    1,870,690
                                INDUSTRIAL TRUCK
                        Filed July 20, 1928        7 Sheets-Sheet 5

INVENTOR
Edward H. Remde
BY
Geo. B. Pitts
ATTORNEY

Aug. 9, 1932.　　　E. H. REMDE　　　1,870,690
INDUSTRIAL TRUCK
Filed July 20, 1928　　　7 Sheets-Sheet 6
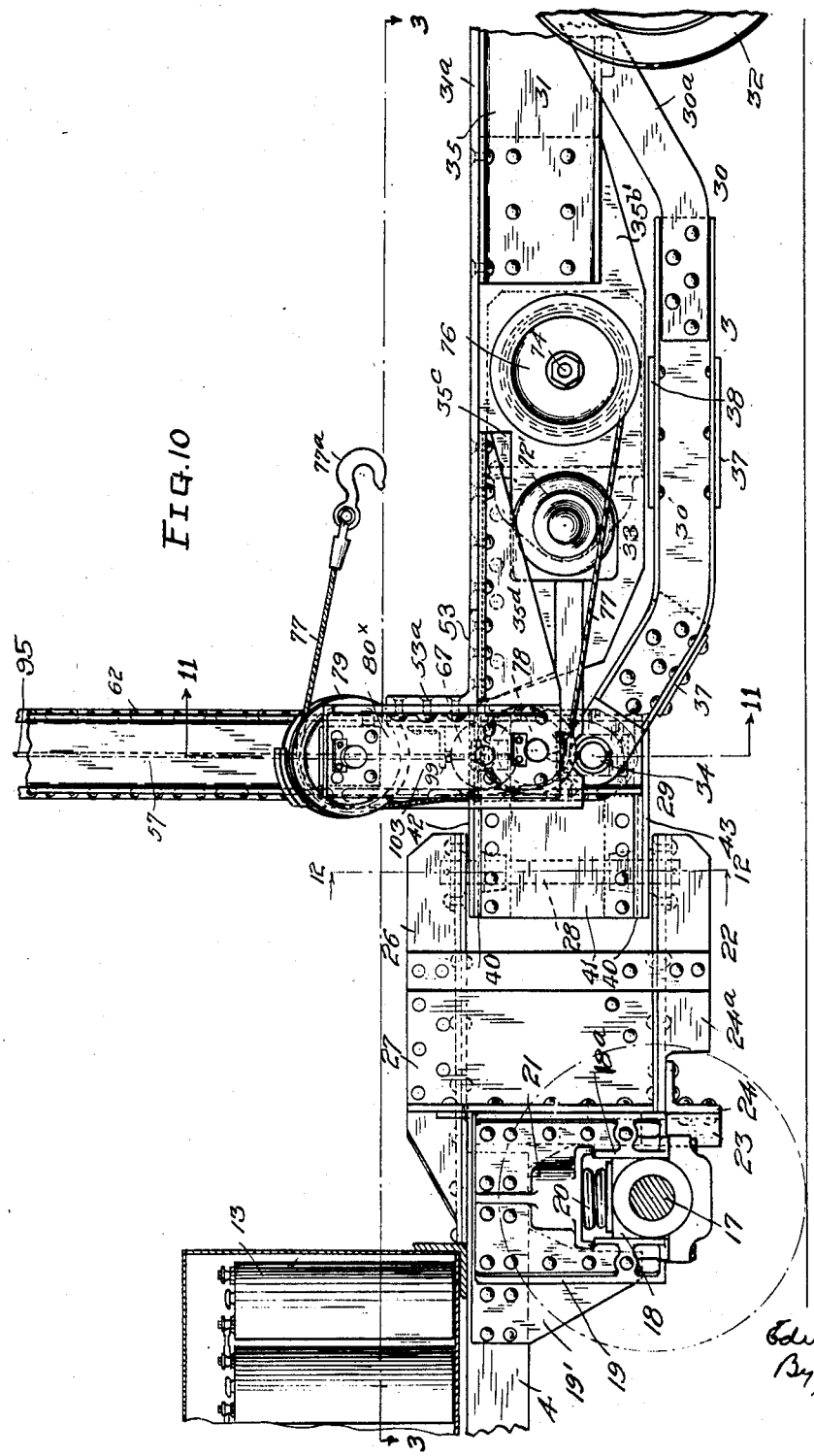
INVENTOR
Edward H. Remde
By Geo. B. Pitts
ATTORNEY Aug. 9, 1932. E. H. REMDE 1,870,690
INDUSTRIAL TRUCK
Filed July 20, 1928 7 Sheets-Sheet 7
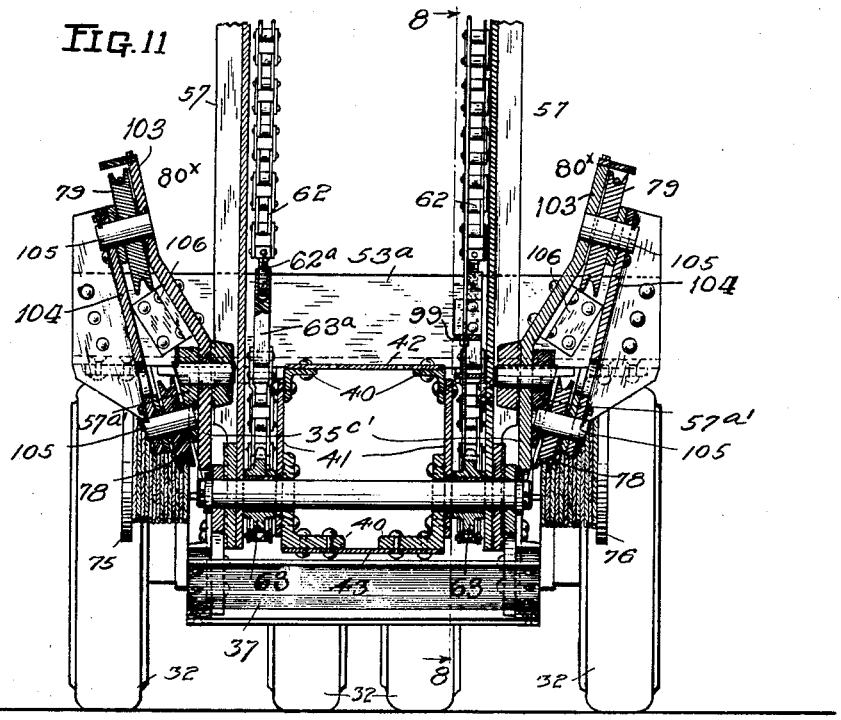
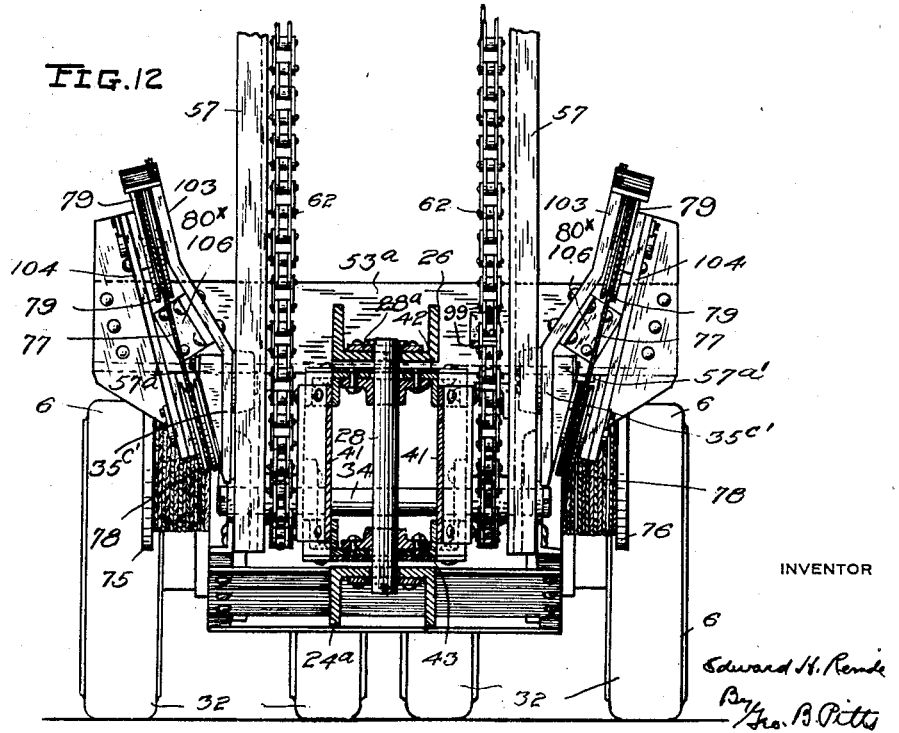
INVENTOR
Edward H. Remde
By Geo. B. Pitts
ATTORNEY Patented Aug. 9, 1932

1,870,690

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed July 20, 1928. Serial No. 294,211.

This invention relates to an industrial truck capable of handling loads, more particularly where the loads are bulky or relatively large in size or heavy and where the same are to be transported through areas of limited size or area or to be positioned in or removed from areas of predetermined sizes or extent, such for example, freight cars or other carriers. The truck is capable of not only handling bulky or heavy loads in a rapid manner economically, but of positioning them in a predetermined area or space, such as a freight car or other form of carrier in any desired order to the end that the full capacity of such area or space may be utilized.

The truck is of the sectional type whereby the range of load handling operations is increased particularly with respect to relatively long loads where the same are to be transported into limited areas and discharged therein in predetermined positions or picked up in such areas and transported to any desired station.

One object of the invention is to provide an improved truck of this character comprising a traction portion and a load carrying portion and mechanism under control of the operative for operating the latter portion into position either to support the load while transporting it or into an inclined position, whereby the operative may operate the truck to effect the picking up of a load or its discharge in a predetermined position.

Another object of the invention is to construct a truck of this character that is relatively simple in construction but capable of handling relatively bulky or heavy loads in a rapid and economical manner.

Another object of the invention is to construct a truck capable of supporting relatively heavy or large loads and conveying them through passages having relatively little area for turning, where trucks of the ordinary type could not be used.

Heretofore great difficulty and expense has resulted in shipping in freight cars relatively heavy and large boxes, bulky material and bound together metal sheets, especially where such crated or bound together sheets weigh several tons. In the shipments of such packages it is desirable to load them in side by side relation in a freight car, but so far as I am aware, the trucks or other apparatus for handling loads heretofore used even when increased in size and strength have been incapable of being driven into the car and discharging such a package or packages therein in proper position to insure loading of the car to its full capacity or of being driven into a loaded car and picking up each load and conveying it to its place of storage or use. It is therefore another object of my invention to provide a truck capable of handling such loads into and out of a freight car, whereby the latter may be rapidly and economically loaded or unloaded.

Another object of the invention is to provide an improved sectional truck wherein the operating mechanism for positioning the load carrying platform for loading or unloading is mounted on the load carrying section of the truck.

A further object of the invention is to construct a section type of truck having a swingable load carrying platform and to provide the latter with one or more auxiliary supporting devices which may be positioned to support the outer portion of the load carrying section to co-operate with its supporting wheels to support such portion, whereby the weight of the load will be distributed over a wide area of the floor.

Other objects of the invention will be apparent to those skilled in the art to which my invention relates from the following description taken in connection with the accompanying drawings, wherein Fig. 1 is a side view of a truck embodying my invention; parts being broken away.

Fig. 2 is a fragmentary side view of parts shown in Fig. 1, but somewhat enlarged.

Fig. 3 is a fragmentary section on the line 3—3 of Fig. 1.

Fig. 4 is a fragmentary section on the line 4—4 of Fig. 2.

Figure 8:
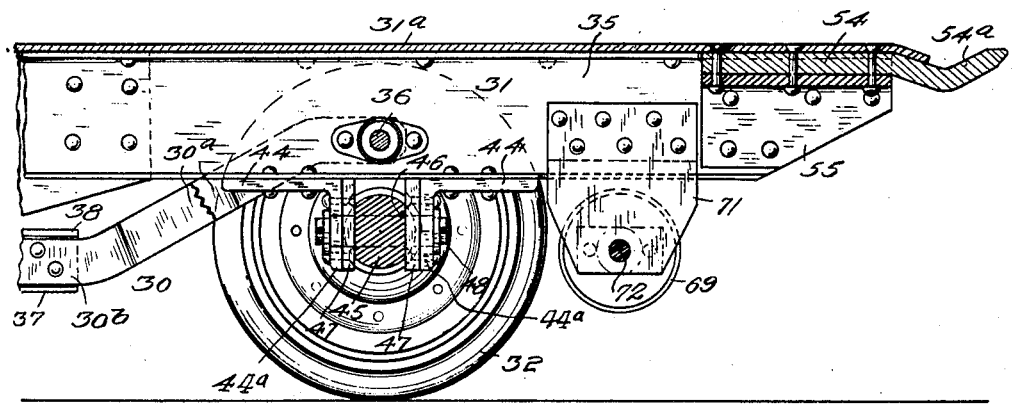

Fig. 5 is a section on the line 5—5 of Fig. 1.
Fig. 6 is a section on the line 6—6 of Fig. 1.
Fig. 7 is a section on the line 7—7 of Fig. 3.
Fig. 8 is a section on the line 8—8 of Fig. 9.

Figure 9:
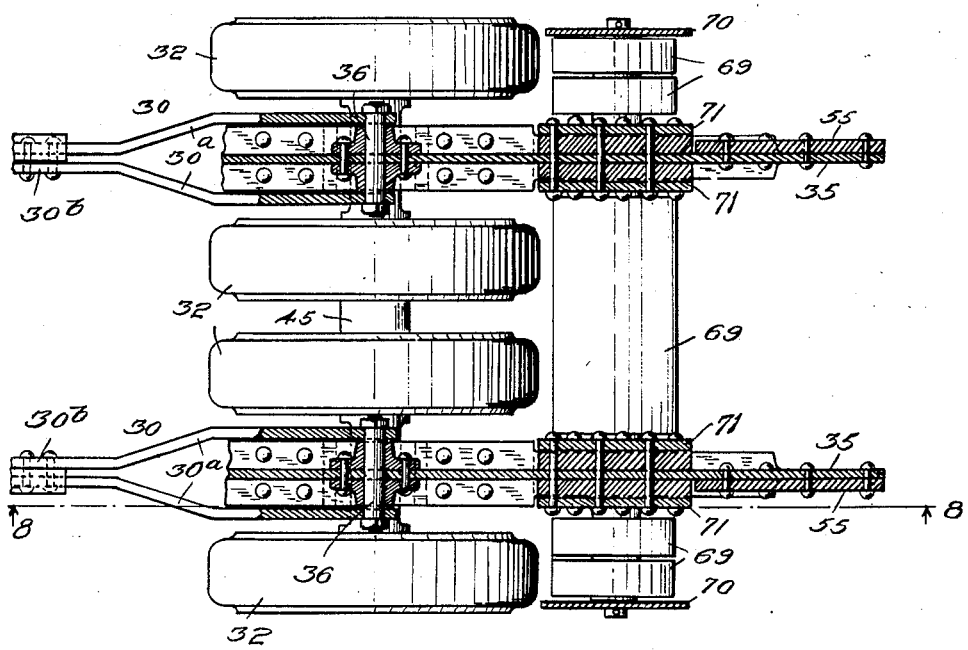

Fig. 9 is a section on the line 9—9 of Fig. 5.

Fig. 10 is a fragmentary side view of a truck embodying my invention, but showing a slightly different form of construction.

Fig. 11 is a fragmentary section on the line 11—11 of Fig. 10.

Fig. 12 is a section on the line 12—12 of Fig. 10.

In the drawings, 1 indicates as an entirety a load handling and transporting truck. The truck comprises generally a traction and controlling section 2 and a loading or unloading and carrying section 3 for the load, said sections being inter-connected for steering and propelling purposes in a manner to be later described, whereby loads of bulky or heavy material or packages large in size or heavy in weight and particularly loads which are both relatively large and heavy may be handled with facility and conveyed through passages having relatively short turning areas and into and out of freight cars or other carriers in a manner which permits the cars or carriers to be economically loaded with respect to the loading or unloading operations and to be economically shipped with respect to the space available therein. The section 2 consists of a suitable frame 4 mounted on wheels 5, 6; by preference the former being steerable by means of a lever 7 and the latter being driven by a motor 8 through a suitable power transmitting mechanism. 9 indicates a pair of uprights secured to the outer end of the frame 4 and supporting the steering lever 7 and other parts to be referred to. 10 indicates brackets carried on the lower end of the uprights 9 and supporting the usual platform and brake operating pedal (which are not shown), the latter being connected through a suitable linkage (not shown) with a brake mechanism 12, which operates to engage and release a wheel driven by the motor 8. 13 indicates the batteries for supplying current to the motor 8 and a motor 14 to which reference will later be made.

I preferably provide a pair of wheels 5, mounted on an axle 5a. The opposite ends of the axle are supported by a forked member 5b, the shank portion of which is rotatable to effect steering of the section 2 and also steering of the section 3 through the pivotal connection to be later described, the connections between the forked member and steering column 7a not being shown.

15 indicates a controller for controlling the supply of current to the motor 8. The controller 15 is connected by a linkage with a handle 16.

The axle 17 for the wheels 6 is mounted in suitable bearings 18 which are movable between opposing guide walls 18a provided in castings 19, each secured in face to face relation to a reinforcing plate 19'. As shown, each plate 19' and adjacent casting are secured to and depend from one of the sills of the frame 4. Suitable compression springs 20 are interposed between the bearings 18 and seats formed within inverted cups 21 which are formed integrally with the castings 19.

22 indicates as an entirety a draft member extending outwardly from the inner end of the frame 4 to connect the latter to the section 3. Of the member 22, 23 indicate angles secured to the inner surface of the plates 19'. 24 indicates an angle connected to the lower ends of the angles 23 and bridging the space between them. 24a indicates a pair of angle bars connected to the angle 24 and extending therefrom, their outer ends being brought together into parallel relation. 25 indicates a plate mounted on the inner free ends of the frame sills 4. 26 indicates a pair of angle bars supported on the plate 25 and extending therefrom, their free ends being brought together into parallel relation. As shown, the bars 26 are disposed in spaced relation to and above the bars 24a and in the same vertical plane. The intermediate portions of each bar 24a and the adjacent bar 26 are connected by a plate 27, which is also connected along its inner edge to the adjacent angle 23. Each pair of bars 24a, 26, have portions of their abutting edges cut away to form an opening, each opening so formed being in alignment with the other opening to receive a pivot pin 28, which forms one of the elements of the pivotal connection 29 (to be later described) between the truck sections 2, 3. The surfaces of the members 24a, 26, surrounding the openings formed therein are reinforced by plates 28a (see Figs. 3 and 12).

The load supporting and carrying section 3 includes a main frame 30 and a tiltable frame 31 and one or more pairs of supporting wheels 32 for these frames and any load which may be mounted on the latter frame. The frame 31 is tiltable so that it may be inclined to the horizontal (see dotted lines in Fig. 1) to bring its outer or free end in close relation to the floor or surface, in which position the platform 31a of the frame 31, is loaded or a load thereon is discharged. To effect a loading, the truck is driven forwardly so as to project the outer end of the platform 31a below the load; the load is then engaged by the engaging elements of a pulling mechanism (indicated as an entirety at 33) to be later described and drawn up the platform preferably until its center of gravity is inwardly of the axis on which the frame 31 swings, following which the frame 31 is swung to its horizontal or load transporting position. To discharge a load the frame 31 is tilted to its inclined position, as already set forth, which causes the load to slide down the platform 31a until its outer end engages the floor; then the truck is driven in a direction away from the load, which permits its opposite end to ride down the platform as the truck moves away.

The main frame 30 comprises a pair of members connected at their inner ends to a horizontally arranged shaft 34, which forms another element of the pivotal connection 29 between the truck sections 2, 3. The rear ends of the frame members are pivotally connected to a pair of longitudinal beams 35, which and the platform 31a constitute the swingable or tiltable frame 31. The members constituting the frame 30 are preferably of sectional form, the outer portion of each member consisting of spaced legs 30a which straddle the adjacent beam 35 (see Fig. 9), the free ends of the legs being formed with openings registering with an opening formed in the adjacent beam. 36 indicates a pin extended through these openings to pivotally connect the parts together, the pin being held in position by suitable devices such as nuts threaded on their ends. To the opposite faces of each beam 35 are secured hollow bosses which register with the opening therein, the purpose of these bosses being to reinforce the metal around such opening and to space the legs 30a apart whereby they will clear the flanges of the adjacent beam. The inner sections 30b of the members forming the frame 30 are pivoted on the horizontal shaft 34, as already described, and permit the sections 2, 3, to articulate relative to the horizontal. The bars 30b are preferably connected in rigid relation by transverse members 37, 37 and 38, the latter forming a rest or support for the swingable section 31 when it is in horizontal position.

39 indicates a draft member serving as the connection between the shaft 34 and pivot pin 28. The member 39 consists of pairs of converging angles 40 connected by side plates 41 and top and bottom plates 42, 43, the lower angles 40 and side plates 41 being formed with aligned openings through which the shaft 34 extends, as shown in Fig. 4. The inner ends of the angles 40 fit between the pairs of angle bars 24, 26 (see Figs. 1, 10 and 12) and the top and bottom plates 42, 43 are formed with aligned openings which register with the openings formed between the bars 24, 26, so that the pivot pin 28 may extend therethrough and pivotally connect the draft members 22, 39, together and provide a vertical pivot to permit the truck's sections to articulate relative to a vertical plane, so that steering and manipulation of the truck may result.

44 indicates a pair of angles secured in a suitable manner to the lower sides of each beam 35, the depending portions 44a of the angles being spaced and supporting between them an axle 45 for the wheels 32 (see Fig. 8). The opposite sides of the axle 45 are flat as shown at 46, and wear plates 47 are disposed between these sides 46 and angle portions 44a. The axle 45, plates 47 and angle portions 44a are formed with openings adapted to register one with the other to receive a pin 48, whereby the axle 45 is connected to the angle portions 44a. I prefer to provide two pairs of wheels 32 in transverse alignment, as shown, with the wheels of each pair disposed at opposite sides of one of the beams 35. Where the wheels of each pair are mounted on a separate axle, such as shown in my co-pending application Ser. No. 289,462, the pin 48 permits the pair of wheels to rock on a longitudinal axis; but in the present form of construction a single axle 45 is provided for both pairs of wheels 32, so that the angles 44 and pin 48 for one pair of wheels co-operate with similar elements for the other pair of wheels to connect the axle to the beams 35.

In the illustrated form of construction the swingable member 31 of the load carrying section 3 is fixed to the axle 45 and the frame 30 is pivotally connected to such member, so that the latter swings about the axis of the axle 45, but the frame 30 could be connected to the axle and the member 31 could be pivotally connected to the frame 30. The mounting for both pairs of wheels 32 on the axle 45 are similar so that the description of one will suffice. As shown in Fig. 8, the outer portions of the axle 45 are reduced to form shoulders 45a', each serving as a seat for a ring 49. The inner race of an anti-friction bearing 50 for the inner wheel of the pair abuts the ring 49. Between the inner race for the bearing just referred to and the inner race of an anti-friction bearing 50a for the other wheel is a spacing sleeve 51. 52 is a cap secured to the end of the axle 45 and having a rim engaging the inner race of the bearing 50a and acting through it and the sleeve 51 to position the bearings on the axle 45. Each wheel 32 comprises a two part web, one part carrying the wheel rim and the other part being removably connected thereto. The inner portions of the web parts are shaped to form an annular chamber into which fits the races of the adjacent bearing.

The platform 31a extends from end to end of the beams 35 and comprises a plate secured to the beams and to the horizontal portion of an angle 53 extending across its inner end, as later set forth the up-standing portion 53a of the angle serving as a stop for the load when the latter is being pulled longitudinally of the platform by the loading mechanism 33. The outer end of the platform 31a is provided with a transverse member 54 secured to the under side of the platform and beams 35 by angles 55. The outer portion of the member 54 projects beyond the platform end and such portion is bent on longitudinal lines preferably at such angles to its main portion that its outer marginal edge section 54a may be disposed flat against the surface (see dotted lines in Fig. 1) when the platform section or member 31a is inclined into its loading or unloading position. This form of construction also provides a suitable device that may be projected below a portion of the load (such as a box, crate or a bundle of metal sheets) which is to be loaded on the load carrying section.

Each of the beams 35 may be of sectional construction, preferably consisting of an I-beam 35a, plates 35b, 35b', 35c, and angles 35d; the plate 35b and angle 35d serving to connect the plate 31a and angle 53 together and the plate 35c having an extended portion (see Fig. 3) to which reference will later be made.

56 indicates as an entirety means for swinging or operating the platform member 31 to position it for loading or unloading and for transporting a load, these means being mounted on the load carrying section. Of the swinging means, 57 indicates a pair of channel members having in their lower ends openings through which the shaft 34 extends so that the channels may swing on the latter for reasons that will later appear. The upper ends of the channels 57 are connected in spaced relation by a horizontal plate 57a and vertical plates 57b, which are secured to each other and the guide members 57 by a plurality of angles 58. The plate 57a forms a suitable base or support for a suitable power mechanism 59. The power mechanism includes a shaft 60 mounted in the bearings provided in the walls of a casing 61 and standards 61a fixed to the plate 57a. The casing 61 encloses a suitable reduction gear mechanism through which the power of the motor 14 operates to drive the shaft 60 in either direction. The shaft 60 is provided with a sprocket—preferably two sprockets—around which endless chains 62 run; the chains 62 also run around sprockets 63 loosely mounted on the shaft 34, each sprocket being disposed between one of the channels 57 and the adjacent side plate 41 (see Figs. 4 and 11). Each chain 62 is provided in its length with a pair of adjustably connected elements, preferably comprising a threaded member 62a fitting into a threaded opening in a member 63a. 64 indicates a link in each chain to which is connected an arm 65 projecting from the inner end of the platform member 31, these arms serving to connect the latter to the chains 62 so that when the chains are operated, the platform may be swung to the inclined position and back again. Each plate 35c is extended beyond the inner end of the platform 31a to a point at one side of the adjacent guide channel 57 as shown at 35c' and carries a stud shaft 66 on which is loosely mounted a roller 67 slidably engaging the flanges of the channel. The roller 67 serves as a slidable pivotal connection between the platform member 31 and guide channels 57, so that in the swinging movement of the platform member 31, the guide channels will swing about the shaft 34 and accommodate themselves to the path traversed by the inner end of the platform. Each extension 35c' is preferably provided with a reinforcing block 57a' into which the shaft 66 extends to form an adequate support for the latter. The block 57a' tapers toward its lower end to insure clearance of parts to be later described.

As the chains 62 move bodily with the channels 57, it will be seen that the latter remain in operative connection with the platform and are therefore capable of swinging the platform to the desired position. As the platform and guides swing about different axes, the arms 65 are pivotally connected to the links 64 by pins 68.

69 indicates one or more auxiliary supporting wheels disposed below the swingable member 31 and outwardly of the wheels 32.

The wheels 69 have two functions: first, they may co-operate with the wheels 32 to support the load which is on the platform in the event the swingable member is operated to an intermediate position or until the wheels 69 bear on the floor or surface, so that both the wheels 69 and 32 will carry the load, the latter being held on the platform 31a in any suitable manner or by engagement of the loading mechanism 33 therewith; second, the wheels 69 co-operate with the pivotal connection 29 to support the section 3 when the platform member 31 is moved to an extreme inclined position (as shown in dotted lines in Fig. 1) for loading or unloading position, in which position the wheels 32 are raised off the floor. Under some circumstances, one wheel may be sufficient and in other cases two wheels may be ample, but where the loads are relatively heavy, I prefer to provide a plurality of wheels the treads of which collectively substantially equal the area between the outer side edges of the tires for the opposite outer wheels 32.

In the preferred arrangement I provide a depending bracket 70 adjacent either side edge of the platform 31a and a pair of depending brackets 71 at the opposite sides of each beam 35, these brackets being formed with aligned openings to receive an axle 72 on which are mounted between the brackets the wheels 69, a single wheel having a relatively wide tread occupying the space between the inner brackets 71.

In the preferred form of construction I provide a plurality of wheels 32 (more than two) all mounted on a single rigid axle and a plurality of wheels 69 (more than two) all mounted on a single rigid axle, so that in the driving of the truck with either or both pairs in rolling engagement with the floor, the weight of the load is distributed over a wide area and upon a plurality of boards and beams therefor, such for example, when the truck is being operated upon the floors of freight cars or other carriers, instead of being concentrated at two supporting points in the same transverse plane. By mounting each set of wheels upon a single rigid axle, the weight is carried more uniformly by all thereof and danger of any one wheel damaging the floor due to weakness in the portion over which such wheel may be passing is substantially eliminated. Each bracket 70 and 71 is secured to the platform or adjacent beam in any desired manner.

Of the loading mechanism 33, 72' indicates an electric motor adapted to be supplied with current from the batteries 13, such supply being controlled by a suitable controller (not shown). The casing for the motor 72' is connected to a casing 73, in which is mounted suitable power mechanism driven by the shaft of the motor 72', the driven shaft 74 of such power mechanism extending in opposite directions beyond the ends of the casing 73 and carrying suitable drums 75, 76, on which winds flexible members—preferably steel cables 77. The motor 72' and casing 73 are connected to and supported in any desired manner by the beams 35 so that they may swing with the platform or swingable member 31. The shaft 74 preferably extends at its opposite ends beyond the beams 35 so that the cable winding and unwinding drums may be disposed on the outer sides thereof. Each cable 77 runs around one or more reeving elements, preferably two such elements designated 78 and 79, so that its free end may be positioned above the platform 31a.

Each pair of reeving elements 78, 79, are preferably mounted in a movable frame 80 whereby the latter element may be moved into position to guide and support the cable at one side of the load or in line with that portion of the load with which the load engaging device 77a is engaged, whereby loads of different width may be engaged and loaded on the platform. The frame 80 comprises a pair of members 80a held in spaced parallel relation by blocks 81 and formed with pairs of aligned openings which support shafts 82. The shafts 82 support the reeving elements or sheaves 78, 79—see Fig. 4. The members 80a are preferably formed from a single section of sheet metal bent on itself, the curved end co-operating with the adjacent block 81 to form a bearing for a pivot pin 83 on which the frame 80 swings, so that its upper end may swing outwardly relative to the side edge of the platform and thus permit the adjacent cable 77 to adjust itself automatically to loads of different widths.

The pivot pin 83 is supported at its opposite ends by a pair of angles 84, 85, the former being secured to the extension 35c' by the rivets 84a and the latter being secured to the plate 35b' by rivets 85a. 86, 86, indicate lugs or other devices carried by the flange 53a and serving as a fixed connection for the inner ends of expansion springs 87. The opposite ends of the springs 87 are connected by links to the frames 80 and normally tend to swing them inwardly against suitable stops 88. The springs 87 are capable of expanding to permit the frames 80 to swing outwardly, which movement may be limited by arms 89. To effect a loading operation, the platform is swung to its inclined position; then the truck is driven to a position in front of the load with its end portion 54a projected below it; then the cables 77 are paid out and their hooks 77a connected to the load at any desirable place; next the motor 72' is driven in a direction to wind the cables on the drums 75, 76, this operation serving to pull or draw the load upon or longitudinally of the platform 31a.

90 indicates as an entirety a limit switch mechanism having pairs of switch contacts through either of which the circuit to the motor 14 is completed when the latter is operating in either direction and broken by a movable member connected to and operated by a rock shaft 91. The pairs of switch contacts and the devices for operating them, which are enclosed in a casing 92, form the subject-matter of my co-pending application Ser. No. 610,791 (see Letters Patent No. 1,726,717, dated September 3, 1929). The casing is preferably carried by a bracket 93 depending from the adjacent plate 57b. The shaft 91 carries a lever 94 from the outer end of which depends a rod 95. The rod 95 extends downwardly adjacent to one of the guide channels 57 and extends through an opening formed in the flange of an angle 96 carried thereby, the walls of the opening serving to guide the rod as it moves endwise. The rod 95 carries adjustable collars 97, 98, the former being arranged to be engaged by the arm 99 provided on the member 63a of the adjacent chain 62 when the swingable section 31 in moving downwardly to its horizontal position approaches the limit of its movement, and the latter being arranged to be engaged by the arm 99 when the section 31 approaches its limit of movement in swinging to the inclined position. When either collar 97 or 98 is engaged as just described, the rod 95 is moved endwise and the rod in turn through the lever 94 rocks the shaft 91 and effects a breaking of the circuit to the motor 14, whereby the latter is stopped. I interpose between the collar 97 and bracket 96 a coiled spring 100 which is compressed by the collar 97 when the latter is engaged by the arm 99, so that upon the subsequent movement of the arm 99 upwardly, the spring 100 will restore the rod to what may be termed its normal position, that is, that position in which both pairs of switch contacts are closed. Below the bracket 96, the rod 95 carries a collar 101 and between this collar and the bracket is a coiled spring 102, which is compressed when the collar 98 is engaged by the arm 99, so that upon the subsequent movement of the arm 99 downwardly, the spring 102 will restore the rod to its normal position.

In Figs. 10, 11 and 12 I show a slightly different form of construction in which the frames, which support the pairs of reeving elements or sheaves 78, 79, for the cables 77, are fixed or stationary, instead of being mounted to move outwardly, as shown in Figs. 1, 2 and 4. The sheave carrying frames, indicated at 80˟ are disposed at opposite outer sides of the guide channels 57 and comprise inner and outer plates 103, 104, supporting the shaft 105, on which the sheave 79 is loosely mounted; the other shaft for the sheave 78 being supported by the outer plate 104 and the plate 35c' or the block 57a' thereon. The inner plate 103 is preferably provided by extending the plate 35c' upwardly inwardly of the stop or flange 53a, the plate 103 being braced by an angle 106 secured to the latter. The outer plates 104 preferably comprise angles secured to the stop 53a. The plates 103 are bent laterally so as to support the sheaves 79 adjacent the side edges of the platform 31a.

By making the truck of sectional construction larger and heavier loads may be carried and the same transported through aisles having limited turning areas where the usual types of trucks or trucking mechanisms could not be used; also, the load carrying section by its pivotal connection with the traction section may be so operated that loads may be picked up or discharged in limited areas; for example, in connection with freight cars of the box type, my improved truck is capable of transporting into the car and discharging therein the maximum number of packages of sheet steel capable of being shipped therein and also of being driven into a car loaded with packages of this sort and picking each up and transporting it to any desired place or station, whereby the loading or unloading of cars with relatively heavy packages of this type is greatly facilitated and cheaply effected. Obviously the truck is capable of transporting and handling other kinds and types of loads economically and rapidly.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a traction section, a load carrying section, draft members carried by said sections, a pivot connection between one of said members and said load carrying section, a pivot connection between said members, the axes of said connections being at right angles to each other, wheels for supporting said traction section, a pair of wheels below said load carrying section and cooperating with said draft members to support said section, a platform having an unobstructed surface swingably mounted on said load carrying section to dispose its outer end in close relation to the floor, whereby driving of said sections forwardly will project the platform below a load and cause the latter to ride up said platform, means on said load carrying section for operating said platform, and means for steering certain of the wheels for said traction section, said operating means comprising a member pivotally mounted on the pivot between said draft member and load carrying section, a connection between said platform and said pivoted member and a power mechanism for moving said connection.

2. In apparatus of the class described, the combination of a traction section and a load carrying section, wheels for supporting said respective sections, means for steering certain of said wheels, means for driving certain of the wheels for said traction section, pivotal connections between said sections, a platform swingably mounted on said load carrying section, and arranged to be inclined to the horizontal, and means for moving a load longitudinally of said platform, said moving means comprising spaced supports, guides carried by the outer ends of said supports, flexible members running over said guides and means for pivoting the inner ends of said supports on the opposite inner ends of said platform, whereby their outer ends may swing laterally to permit said flexible members to accommodate themselves to the width of the load.

3. In apparatus of the class described, the combination of a traction section and a load carrying section, wheels for supporting said respective sections, means for steering certain of said wheels, means for driving certain of the wheels for said traction section, pivotal connections between said sections, a platform swingably mounted on said load carrying section, and arranged to be inclined to the horizontal, and means for moving a load longitudinally of said platform, said moving means comprising spaced supports, guides carried by the outer ends of said supports, flexible members running over said guides and means for pivoting the inner ends of said supports on the opposite inner ends of said platform, whereby their outer ends may swing laterally to permit said flexible members to accommodate themselves to the width of the load, and means normally tending to move said supports inwardly.

4. In apparatus of the class described, the combination of a wheel mounted frame, a load carrying member movably mounted thereon, means for operating said member, and means for moving a load longitudinally of said member, said means including a pair of flexible elements disposed at opposite sides of said member and arranged to engage the load, a guide device for each of said flexible elements and a mounting pivotally mounted on and at either side of said load carrying member for movably supporting each said guide device and arranged to move laterally to permit said device to accommodate itself to the width of the load.

5. In apparatus of the class described, the combination of a wheel mounted frame, a platform swingably mounted on said frame and arranged to be inclined to the horizontal, means on said platform for moving a load longitudinally thereof, said means comprising a drum, a flexible member arranged to wind on and off said drum, a support pivoted on said platform and swingable about a longitudinal axis laterally from its normal position, a guide on said support for said flexible member, and means tending to return said support to its normal position.

6. In apparatus of the class described, the combination of a wheel mounted frame, a platform swingably mounted on said frame and arranged to be inclined to the horizontal, and means on said platform for moving a load longitudinally thereof, said means comprising drums, flexible members arranged to wind on and off said drums, supports pivoted at opposite sides of said platform adjacent its inner end on longitudinally extending axes and independently movable laterally outwardly and guides for said flexible members mounted on said supports.

7. In apparatus of the class described, the combination of a wheel mounted frame, a platform swingably mounted on said frame and arranged to be inclined to the horizontal, means on said platform for moving a load longitudinally thereof, said means comprising drums, flexible members arranged to wind on and off said drums, supports pivoted at opposite sides of said platform adjacent its inner end on longitudinally extending axes and independently movable outwardly and guides for said flexible members mounted on said supports, and means normally tending to swing said supports inwardly.

8. In apparatus of the class described, the combination of a traction section and a load carrying section, wheels for supporting said respective sections, said load carrying section comprising a main frame and a platform trunnioned thereon, draft members connected to said traction section and main frame, respectively, and pivotally connected by a vertical shaft, the connection of said main frame to the adjacent draft member consisting of a horizontal shaft, a guide pivoted at its lower end on said horizontal shaft, means bodily movable with said guide and relatively movable to swing said platform about its trunnions, and a device carried by the inner end of said platform and engaging said guide.

9. In apparatus of the class described, the combination of a traction section and a load carrying section, wheels for supporting said respective sections, said load carrying section comprising a main frame and a platform trunnioned thereon, draft members connected to said traction section and main frame, respectively, and pivotally connected by a vertical shaft, the connection of said main frame to the adjacent draft member consisting of a horizontal shaft, a support pivoted at its lower end on said horizontal shaft, and means bodily movable with said support and relatively movable to swing said platform about its trunnions, said means comprising an endless chain having its active run disposed parallel to said support.

10. In apparatus of the class described, the combination of a traction section and a load carrying section, wheels for supporting said respective sections, said load carrying section comprising a main frame and a platform trunnioned thereon, draft members connected to said traction section and main frame, respectively, and pivotally connected by a vertical shaft, the connection of said main frame to the adjacent draft member consisting of a horizontal shaft, a guide pivoted at its lower end on said horizontal shaft, means bodily movable with said guide and relatively movable to swing said platform about its trunnions, and a device carried by the inner end of said platform and engaging said guide, and limit switch means carried by the guide for stopping said swinging means when the platform reaches a predetermined position in one direction.

11. In apparatus of the class described, the combination of a wheel mounted frame, and load hoisting and holding means thereon including a pair of cables, drums for said cables, a pair of guide sheaves, a pair of supports pivotally mounted at their lower ends at the inner end of said frame adjacent the sides thereof and carrying said sheaves at their upper ends, said supports being swingable laterally to permit said cables to accommodate themselves to the load when engaged therewith, and means for operating said drums.

12. In apparatus of the class described, the combination of a wheel mounted frame, and load hoisting and holding means thereon, including a pair of cables, drums for said cables, a pair of supports pivotally mounted at their lower ends on said frame adjacent the sides thereof and each carrying upper and lower sheaves for guiding the adjacent cable, said supports being swingable laterally to permit said cables to accommodate themselves to the load when engaged therewith, and means for operating said drums.

In testimony whereof, I have hereunto signed my name.

EDWARD H. REMDE.